March 11, 1930. S. W. ALDERFER 1,749,899
REENFORCEMENT FOR TIRE BEADS
Filed April 5, 1927
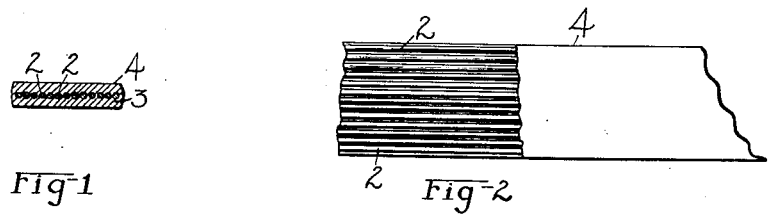
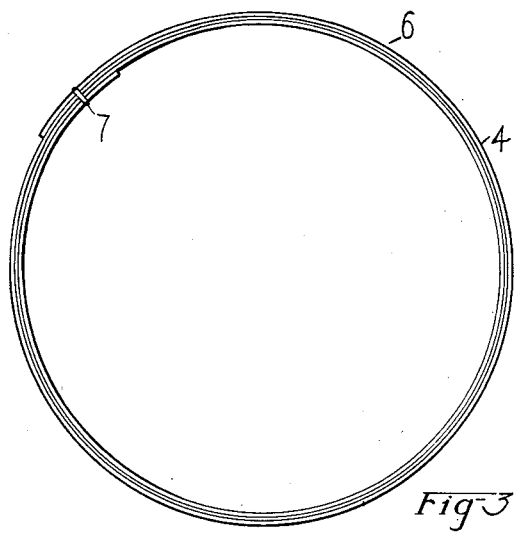
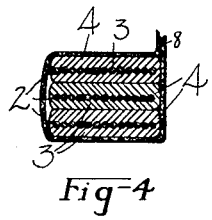
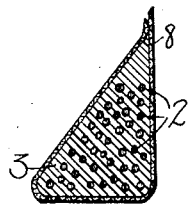
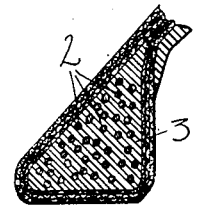
INVENTOR.
Sterling W. Alderfer
BY Ely & Barrow
ATTORNEYS Patented Mar. 11, 1930

1,749,899

UNITED STATES PATENT OFFICE

STERLING W. ALDERFER, OF AKRON, OHIO, ASSIGNOR TO NATIONAL STANDARD COMPANY, OF NILES, MICHIGAN, A CORPORATION OF MICHIGAN

REENFORCEMENT FOR TIRE BEADS

Application filed April 5, 1927. Serial No. 181,096.

This invention relates broadly to the construction of inextensible tire beads such as used in the manufacture of tires of the straight side or inextensible bead type. It is directed more particularly to the design and construction of the metallic reenforcement used in the bead of the tire to impart the inextensibility to the bead. The object of the invention is to secure certain advantages in the manufacture of the bead as will be understood from the description of the invention as given below.

A tire bead usually comprises a ring of rubber having embedded therein a plurality of wires which are of sufficient strength and in sufficient numbers to give the required tensile strength to the bead. The bead may be given a preliminary vulcanization so as to form it in a ring of substantially triangular form, before it is incorporated in the tire or it may be incorporated in the tire structure in a green or unvulcanized state, the complete curing and shaping of the bead taking place when the tire is vulcanized. It is usually surrounded and encased in a fabric covering or jacket and is frequently associated with the so-called "flipper strips" which project outwardly from the bead, and are located between plies of the carcass.

For the reenforcing members of the bead, at the present time, the materials used are either a braided wire tape or a woven wire tape. The braided tape, which is the prevalent form, has a number of objections, the principal one being that it is required to be manufactured in machinery, which is expensive to operate and maintain. The wires constituting the tape are braided and interlaced back and forth across the tape and breakage of the wire is quite frequent, requiring the use of wire of low tensile strength. The woven tape is also required to be formed upon weaving machines, which increase the cost of manufacture; and in addition, the crossing wire used to hold the parallel or warp wires in fixed relationship adds materially to the thickness of the wire tape and interferes with the subsequent rubberizing operation.

Either of these forms of tape is required to be passed through a rubber extruding machine to receive a coating or casing or rubber before being wound into the grommet or ring which is subsequently incorporated in the bead, and this operation is often imperfect owing to the structure of the tape. Both forms of tape are rigid transversely and will not conform easily and readily to the finished formation required in beads, and this is particularly objectionable in the manufacture of tires with narrow beads such as required in the present popular drop center rim constructions.

Cable beads have also been used in the past but so far as known to me, the use of this type of bead has become practically extinct.

The form of bead reenforcement which constitutes the subject of this invention is much cheaper to manufacture and obviates the objections which have been noted above, and in addition, has certain advantages over the old forms of reenforcement, as will be explained in the full description of the invention to follow.

In the drawings which illustrate a preferred embodiment of the invention:

Fig. 1 is a cross-section through a single layer of the improved reenforcing material;

Fig. 2 is a plan of a fragment thereof, the rubber being removed from one end of the material to disclose the arrangement of the wires;

Fig. 3 is a grommet or ring made up from the material of Figs. 1 and 2 and in condition to be incorporated in the bead structure;

Fig. 4 is a cross-section of a bead in the green or unvulcanized state with a covering of fabric thereabout;

Fig. 5 is a cross-section of a bead in the semi-cured condition; and

Fig. 6 is a detail of a tire bead having the improved bead embodied therein.

The reenforcing material consists of a plurality of parallel wires 2 which are arranged in a single plane and in close proximity to one another. Any suitable number of these wires may be employed in a single length of the material. These wires are not interlaced or interwoven but are held together solely by a rubber covering or jacket 3 which completely encloses the wires and penetrates into the crevices or interstices between the wires. The wires are held and maintained in position solely by the rubber jacket or casing which should have the required tenacity to hold the wires together during the subsequent handling incident to the manufacture of the bead.

The rubber may be forced into and around the wires by passing the wires in parallel relationship through a suitable die attached to an extruding machine which causes the intimate coating and bonding of the wires. It will be observed that the tape which is shown and described is characterized to differentiate from the prior tapes used for this purpose in that the wires are held together in tape form solely by the rubber coating and jacket surrounding them. The reenforcement may be termed as a rubber tape having parallel wires embedded therein. As there is no braiding or weaving operation, the wires may be of a greater tensile strength than the wires in the tape heretofore used.

A length of the tape 4 is wound into ring form in a plurality of convolutions sufficient to afford the requisite number of wires as required by the demands of the tire in which it is to be incorporated. A ring or grommet 6 made in this manner is illustrated in Fig. 3. The end of the grommet may be retained in place by the sticky rubber coating, or an additional securing means may be provided, a metallic staple 7 being illustrated for this purpose.

The ring of Fig. 3 is usually covered with a fabric wrapper 8 (Fig. 4) and may be incorporated in the tire in this form, the bead being known in the art as a "green bead" which is completely cured with the tire casing. This form of bead is quite usual in the manufacture of tires by the flat band or drum built method.

In some cases, it is preferable to give the bead a preliminary or partial vulcanization to shape it into substantially triangular cross-section, and this form of bead is illustrated in Fig. 5.

A complete tire bead is shown in Fig. 6, in which the bead is shown occupying its final position in the completely cured tire.

In the vulcanization of the bead either completely within the tire or partially in bead form, the bead is deformed somewhat by the configuration of the mold cavity. The improved form of bead is particularly adaptable for this operation, the several wires being unconnected, except for the rubber, may shift or change their position as required by the vulcanizing process more easily than the wire tape of the previous combination in which the movement of the wires is restricted and retarded by the tape formations. During the vulcanizing process the rubber is softened and will permit the wires to arrange themselves in the bead more readily in the improved form than in the prior forms of bead reenforcement.

It will be observed that the rubber surrounding the wires operates as a temporary holding medium for maintaining the wires in parallel relationship, but that on the vulcanization of the bead, the rubber softens and forms the body of the bead, the wires being free to locate themselves in their most natural position without tension or stresses therein. The rubber casing thus serves the function of holding the wires in ribbon or tape form until the vulcanizing operation.

Other advantages are obtained by the improvement herein described and claimed, as will be apparent to those skilled in the art. This application is a continuation in part of application Serial No. 90,324, filed February 24, 1926. The claim is intended to cover the invention as broadly as the limitations of the prior art will permit, and within a fair interpretation of the claim.

What is claimed is:

A bead construction for pneumatic tires comprising a body of rubber, and a reenforcement comprising a plurality of independent parallel, longitudinal wires embedded therein and unconnected except for the rubber, each of said wires being arranged in a plurality of spaced convolutions about the bead.

STERLING W. ALDERFER.